United States Patent
Duan et al.

(10) Patent No.: US 7,725,987 B2
(45) Date of Patent: *Jun. 1, 2010

(54) HINGE ASSEMBLY FOR A FOLDABLE ELECTRONIC DEVICE

(75) Inventors: Chao Duan, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 902 days.

This patent is subject to a terminal disclaimer.

(21) Appl. No.: 11/391,874

(22) Filed: Mar. 28, 2006

(65) Prior Publication Data

US 2006/0256958 A1    Nov. 16, 2006

(30) Foreign Application Priority Data

May 13, 2005   (CN) ......................... 2005 1 0034647

(51) Int. Cl.
*E05D 11/10* (2006.01)
(52) U.S. Cl. .............................. 16/330; 16/303; 16/340; 16/275; 379/433.13; 455/575.3
(58) Field of Classification Search ................... 16/330, 16/303, 284, 285, 275, 276, 338–342, 374, 16/321, 327, 328, 273; 379/433.13; 445/575.3; 361/680–682, 679.27; 248/919–923
See application file for complete search history.

(56) References Cited

U.S. PATENT DOCUMENTS

| | | | |
|---|---|---|---|
| 6,115,886 A * | 9/2000 | Fujita ........................... | 16/330 |
| 6,175,990 B1 * | 1/2001 | Kato et al. ..................... | 16/334 |
| 6,493,542 B1 * | 12/2002 | Frohlund .................... | 455/90.1 |
| 6,757,940 B2 * | 7/2004 | Lu et al. ........................ | 16/330 |
| 6,772,481 B2 * | 8/2004 | Oshima et al. ................. | 16/330 |
| 6,799,352 B2 * | 10/2004 | Gilchrist et al. ............... | 16/276 |
| 6,802,107 B2 * | 10/2004 | Pan .............................. | 16/325 |
| 7,031,466 B2 * | 4/2006 | Lu et al. ................ | 379/433.13 |
| 7,100,239 B2 * | 9/2006 | Duan et al. ................... | 16/303 |
| 7,337,498 B2 * | 3/2008 | Hsieh .......................... | 16/330 |
| 7,401,382 B2 * | 7/2008 | Luo ............................. | 16/303 |
| 7,404,235 B2 * | 7/2008 | Duan et al. .................... | 16/330 |
| 7,552,512 B2 * | 6/2009 | Duan et al. .................... | 16/330 |
| 7,561,687 B2 * | 7/2009 | Duan et al. ............ | 379/433.13 |
| 2006/0096063 A1 * | 5/2006 | Duan et al. ................... | 16/303 |
| 2006/0254026 A1 * | 11/2006 | Duan et al. .................... | 16/330 |

FOREIGN PATENT DOCUMENTS

CN    03237808.4    11/2004
CN    200420043233.1    3/2005

* cited by examiner

*Primary Examiner*—William L. Miller
(74) *Attorney, Agent, or Firm*—Jeffrey T. Knapp

(57) ABSTRACT

A hinge assembly includes a shaft (12), a follower (16), a cam (18), and an urging means. The shaft has a screw portion (122) defined thereon. The follower has a first cam surface (164) formed on one end surface thereof. The cam has a second cam surface (184) formed on one end surface opposite to the follower. The cam has a screw hole (182) defined therethrough. The screw hole engages with the screw portion of the shaft. The urging means is configured for providing an urging force which moves the follower along the shaft and makes the first cam surface rotatably engage with the second cam surface of the cam.

17 Claims, 7 Drawing Sheets

HINGE ASSEMBLY FOR A FOLDABLE ELECTRONIC DEVICE

BACKGROUND OF THE INVENTION

1. Field of the Invention

The present invention relates to hinge assemblies and, particularly, to a hinge assembly for foldable electronic devices, such as mobile telephones, electronic notebooks, and so on.

2. Discussion of the Related Art

With the development of wireless communication and information processing technologies, portable electronic devices such as mobile telephones and electronic notebooks are now in widespread use. These electronic devices enable consumers to enjoy high technology services anytime and anywhere. Consumers particularly favor foldable electronic devices for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size and/or weight of portable foldable electronic devices. Thus, it is desirable that the hinge assembly coupling the main housing with the cover is modularized and miniaturized. Modularized hinge assemblies usually consist of moving parts such as a cam member, a cam follower, a shaft, and a spring, held together in a unified structure. Where either the cam member or the cam follower directly contacts the spring. The structure is easily and quickly attached to the main housing and the cover during mass production. The cam member and the cam follower are always in contact with each other under the force of the spring.

Although suitable for some foldable electronic devices, sliding friction is produced between the cam member and the cam follower because of the relative rotation therebetween. This friction wastes energy (i.e., making opening and/or closing of the device more difficult) and causes abrasion of the cam member and the cam follower. The abraded surface further adds to the friction therebetween and may eventually lead to premature malfunction or failure of the hinge assembly. In addition, during the process of opening and closing of a flip cover of the foldable electronic device, one of the cam member and the cam follower is quickly rotated under the spring force of the spring, which produces a large impact on the flip cover. The damage caused by this may also eventually lead to premature malfunction or failure of the foldable electronic device.

What is needed, therefore, is a hinge assembly which has a relatively simple and small modularized configuration, which can be produced at low cost, and which has a relatively low amount of friction associated therewith.

SUMMARY OF THE INVENTION

In a first embodiment, a hinge assembly is provided for joining a flip cover to a main body of a foldable electronic device. The hinge assembly includes a shaft, a follower, a cam, and an urging means. The shaft has a screw portion defined thereon. The follower has a first cam surface formed on one end surface thereof. The cam has a second cam surface formed on one end surface opposite to the follower. The cam has a screw hole defined therethrough. The screw hole engages with the screw portion of the shaft. The urging means is configured for providing an urging force which drives the follower movably along the shaft and keeps the first cam surface rotatably engaged with the second cam surface of the cam.

In another embodiment thereof, a hinge assembly includes a shaft, a follower, a friction-reducing member, a driving member, and an urging means. The shaft has a screw portion defined thereon. The driving member is in the shape of cylinder, and the driving member has a screw hole defined therethrough. The screw hole engages with the screw portion of the shaft. The urging means is configured for providing an urging force which makes the cam rotate movably along the shaft and the friction-reducing member engage between the follower and the cam.

Other advantages and novel features will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views.

DETAILED DESCRIPTION OF PREFERRED EMBODIMENTS

Figure 1:
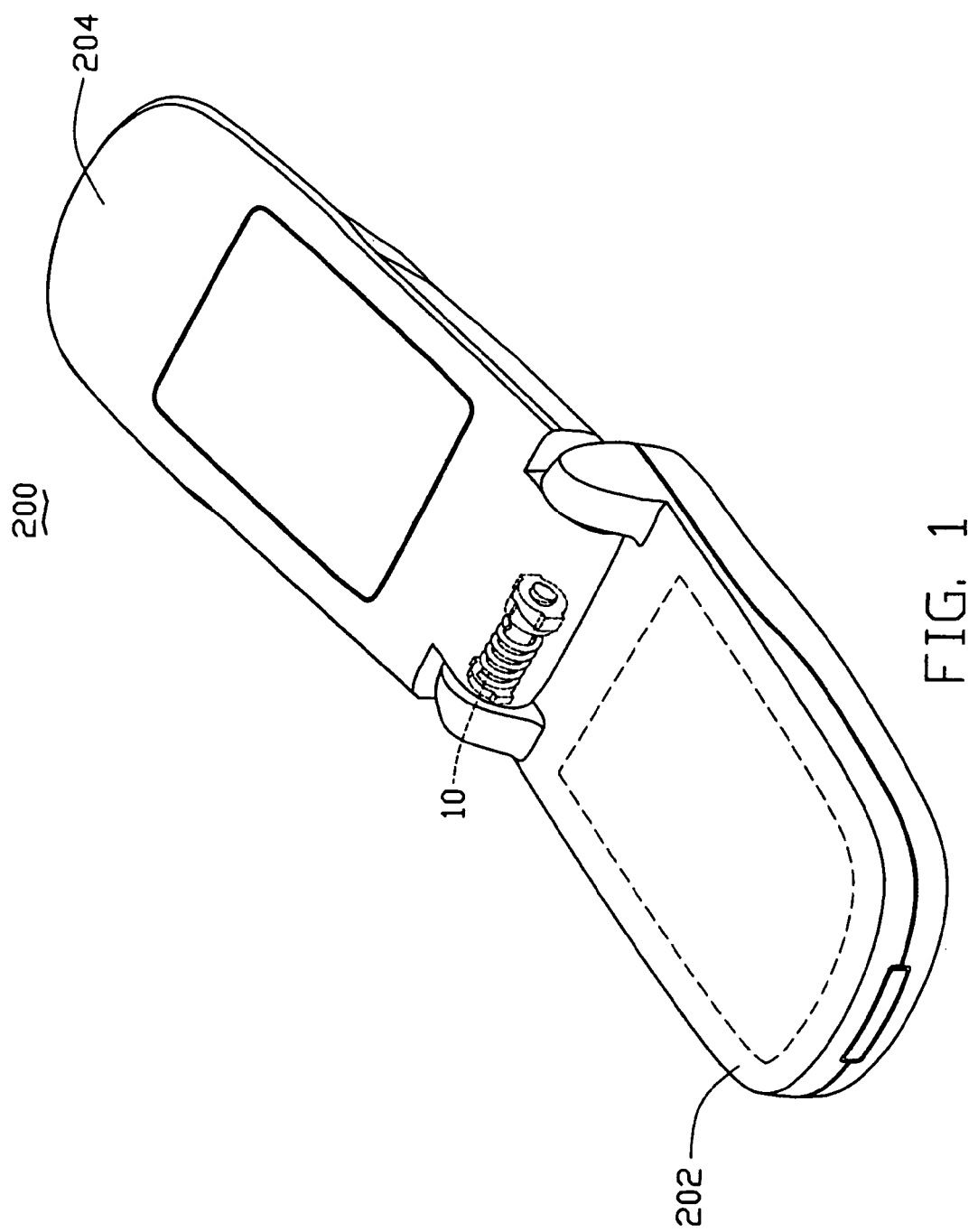
FIG. 1 is an schematic, isometric view of a flip-type mobile phone including a flip cover, a main body, and a hinge assembly, according to a first preferred embodiment, the hinge assembly being shown with dashed lines.

Referring now to the drawings, FIG. 1 shows a flip-type mobile phone 200, which includes a hinge assembly 10, according to a first preferred embodiment. The mobile phone 200 has a main body 202 and a flip cover 204. The main body 202 and the flip cover 204 are pivotally connected to each other via the hinge assembly 10. It should be noted that the hinge assembly 10 may also, for example, be used to interconnect components like a main body and a flip cover of any of a variety of different foldable devices, other than the mobile phone 200.

Figure 2:
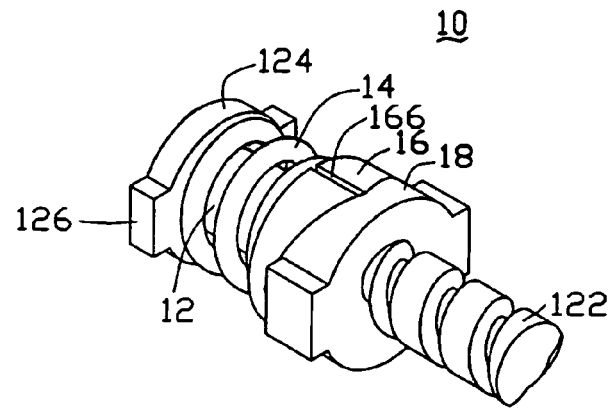
FIG. 2 is an enlarged, assembled view of the hinge assembly of FIG. 1, corresponding to the flip cover being in a closed position.
Figure 3:
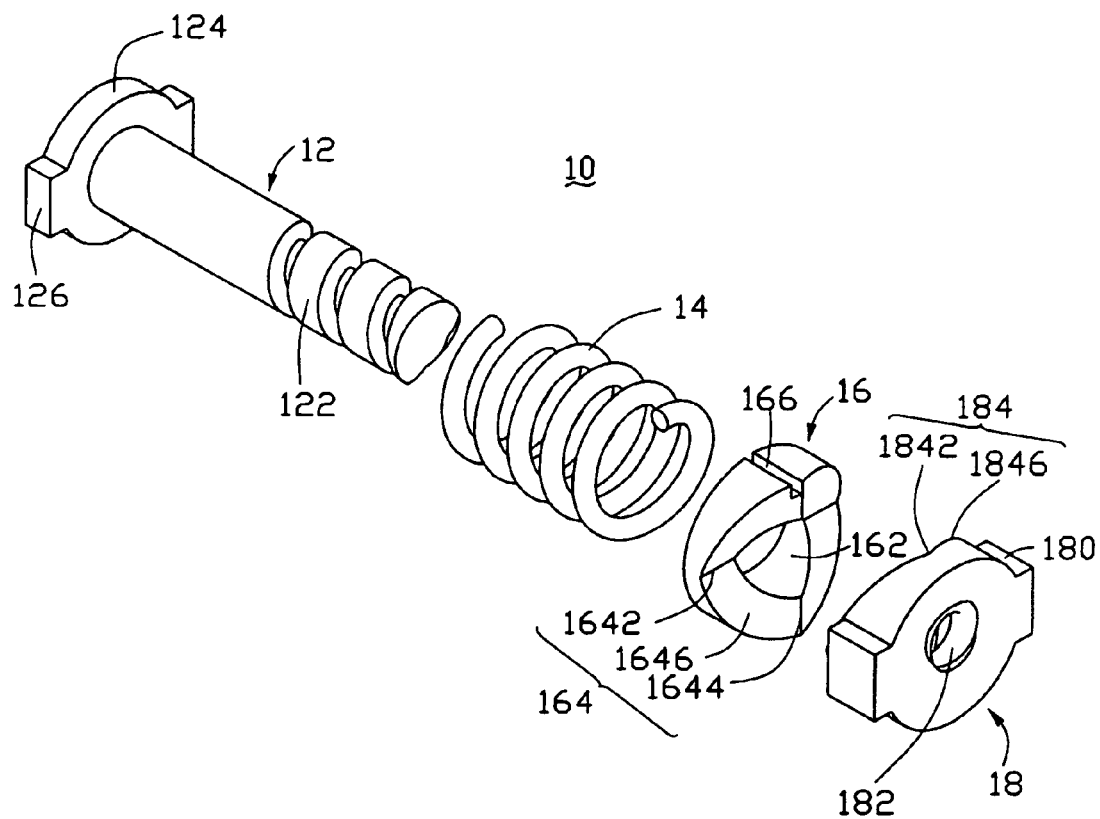
FIG. 3 is similar to FIG. 2, but viewed from another aspect.
Figure 4:
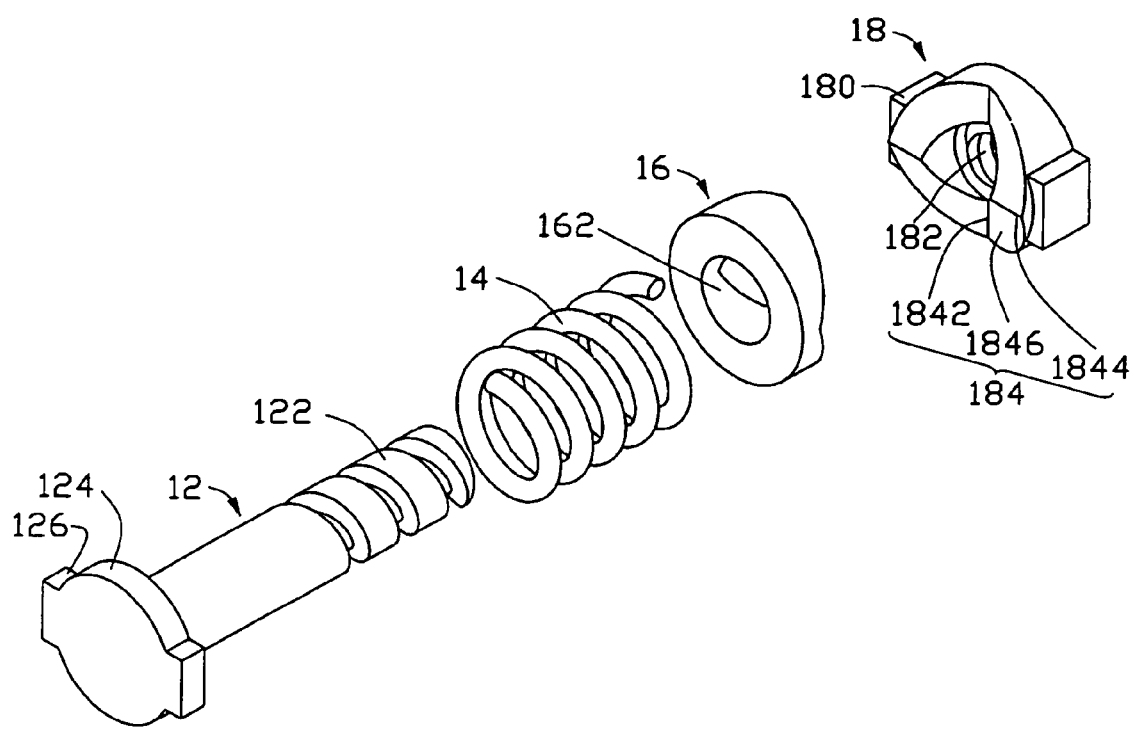
FIG. 4 is an assembled view of the hinge assembly of FIG. 2.

Referring now to FIGS. 2-4, a hinge assembly 10 according to a first preferred embodiment of the present invention is provided. The hinge assembly can be used to connect a main body and a flip cover of a foldable electronic device such as a mobile phone. The hinge assembly 10 includes a shaft 12, a spring 14 functioning as an urging means, a follower 16, and a cam 18.

The shaft 12 includes a screw portion 122 at one end thereof, and a flange portion 124 at the other end thereof. The flange portion 124 has two opposite protrusions 126 formed on outer periphery thereof.

The spring 14 is advantageously helical and is preferably metallic. The spring 14 has an inner diameter larger than a diameter of the shaft 12. Thus, the spring 14 can be located around the shaft 12. A first end of the spring 14 resists the flange portion 124 of the shaft 12, and an opposite second end of the spring 14 biases against the follower 16.

The follower 16 is generally cylindrical, and defines a central hole 162 extending therethrough. The diameter of the central hole 162 is larger than that of the shaft 12 such that the follower 16 can be located around the shaft 12. The follower 16 has a first cam surface 164 formed at one end surface thereof. The first cam surface 164 includes two valleys 1642, two 1644, and four inclined planes 1646 disposed between the valleys 1642 and the peaks 1644. Preferably, the valleys 1642 are located 180 degrees apart from each other, with the peaks 1644 are located 180 degrees apart from each other. The follower 16 has at least one rotating-stop mechanism such as a slot portion 166 defined in outer periphery thereof and extending axially along the follower 16. The slot 166 is for engaging with the main body of the foldable electronic device, so that the follower 16 can be fixedly retained in the main body. Specifically, the main body of the foldable electronic device may form a protruding block (not shown) engaging with the slot.

The cam 18 is a substantially cylindrical body. The cam 18 has two opposite protrusions 180 as fixation portion formed on outer peripheral wall thereof, the protrusion 180 being oriented parallel to a central axis of the cam 18. The protrusions 180 are configured for engaging with the flip cover of the foldable electronic device. The cam 18 has a screw hole 182 defined therein and extending therethrough. The screw hole 182 corresponds to the shape of the screw portion 122 of the shaft 10, thereby facilitating engagement with the shaft 12. The cam 18 has a first cam surface 184 formed at one end thereof. The first cam surface 184 includes two valleys 1842, two peaks 1844, and four inclined planes 1846 disposed between the valleys 1842 and the peaks 1844. Preferably, the valleys 1842 are located 180 degrees apart from each other, and the peaks 1844 are also located 180 degrees apart from each other.

In the assembly of the hinge assembly 10, referring to FIG. 1, firstly, the shaft 10 is passed through the spring 14, the central hole 162 of the follower 16, and the screw hole 182 of the cam 18, in that order, with the screw hole 182 of the cam 18 engaging with the screw portion 122 of the shaft 10.

Referring to FIGS. 1 and 2, in use, the cam 18 is engaged (i.e. operatively located/fixed) in a cavity (not shown) of the flip cover 204 of the mobile phone 200 via the protrusions 180, and cannot rotate relative to the flip cover 204. The flange portion 124 of the shaft 10 is engaged in the main body 202 of the mobile phone 200, and cannot rotate relative to the main body 202. The spring 14 is resisted between the flange portion 124 of the shaft 10 and the follower 16. The flip cover 204 can rotate relative to the main body 202 between an open position and a closed position via the hinge assembly 100. The protruding block of the main body engages with the slot portion 166 of the follower 16 when the flip cover 204 is in the open position.

When the flip cover 204 is in closed position, the flip cover 204 is locked on the main body 202 by a latch of the main body 202, and the spring 14 accumulates a predetermined spring force as shown in FIG. 2. The first cam surface 164 of the follower 16 tightly engages with the first cam surface 184 of the cam 18. In this state, the protruding block of the main body 202 does not lock in the slot 166 of the follower 16. When the flip cover 204 rotates relative to the main body 202 from the closed position to the open position, the latch is unlocked, and the follower 16 and the cam 18 moves axially along the shaft 10 and under the spring force of the spring 14. Simultaneously, the cam 18 rotates relative to the shaft 12 under the screw engagement between the screw portion 122 of the shaft 12 and the screw hole 182 of the cam 18, and thus makes the flip cover 204 rotate relative to the main body 202. Therefore, the flip cover 204 is opened relative to the main body 202 as shown in FIG. 1, and the spring 14 is decompressed. During the opening of the flip cover 204, the follower 16 also rotates together with the cam 18 under the biasing of the spring 14 and the engagement of the first cam surface 164 and the first cam surface 184 of the cam 18, and cannot rotate relative to the cam 18.

When the flip cover 204 rotates relative to the main body 202 from the open position to the closed position, a button disposed outside the main body 202 is pressed so as to cause the protruding block to engage in the slot 166 of the follower 16. Thus, the follower 16 can only move axially along the shaft 12 and cannot rotate relative to the shaft 12 and the main body 202. In this state, the spring 14 is decompressed. When the flip cover 204 is rotated from the open position to the closed position, the flip cover 204 is rotated manually relative to the main body 202. The cam 18 rotates together with the flip cover 204 and relative to the shaft 12. The cam 18 moves axially along the shaft 12 and compresses the spring 14 under the screw engagement of the screw portion 122 of the shaft 12 and the screw hole 182 of the cam 18. Simultaneously, the first cam surface 184 of the cam 18 slides along the first cam surface 164 of the follower 16. When the peaks 1844 of the cam 18 pass over the peaks 1644 of the follower 16, the spring 14 decompresses and drives the follower 16 back toward the cam 18. Because the restoration length of the spring 14 is larger than the screw pitch of the screw portion 122 of the shaft 10, the peaks 1844 of the cam 18 ride along the inclined planes 246 from the peaks 244 to the valleys 242. Thus, the flip cover 204 is completely folded upon the main body 202. Simultaneously, the flip cover 204 is locked on the main body 202 by the latch.

The hinge assembly 10 has small number of elements. The impact force which the flip cover 204 exerts on the main body 202 is reduced because of the screw engagement between the screw portion 122 of the shaft 10 and the screw hole 182 of the cam 18.

Figure 5:
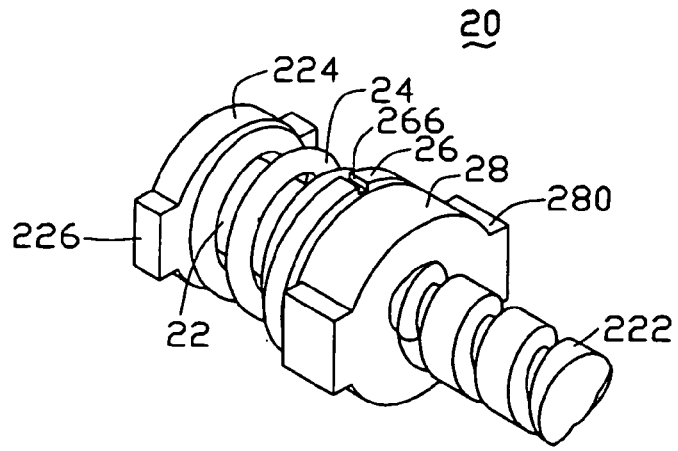
FIG. 5 is an assembled view of a hinge assembly according to a second embodiment of the present invention.
Figure 6:
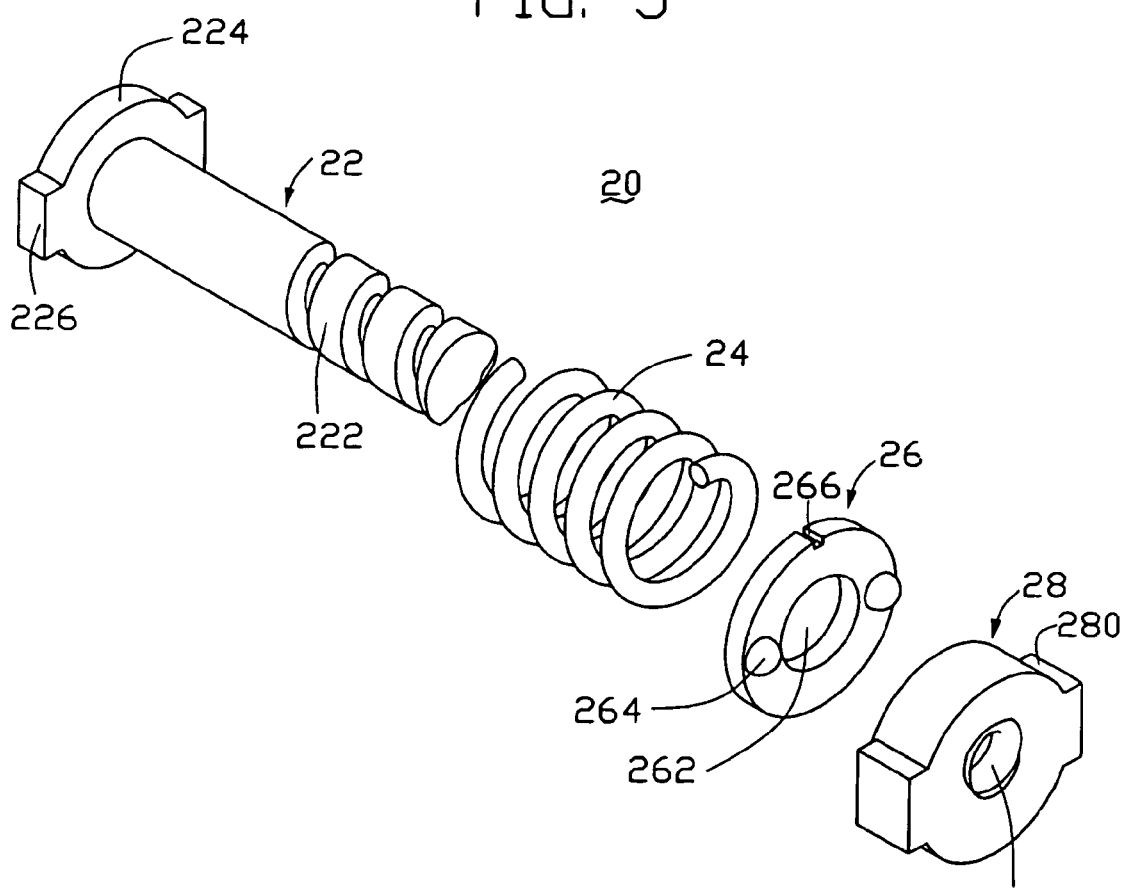
FIG. 6 is an exploded, isometric view of the hinge assembly of FIG. 5.
Figure 7:
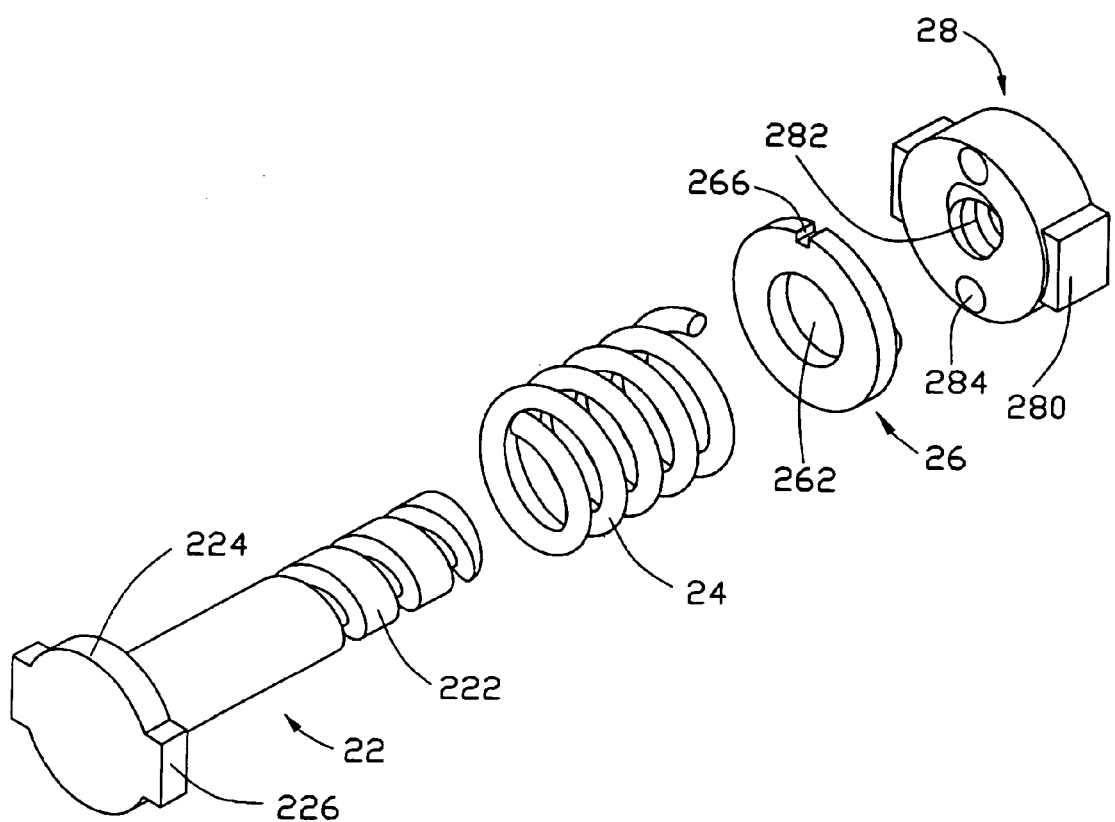
FIG. 7 is similar to FIG. 5, but viewed from another aspect.

Referring to FIGS. 5-7, a hinge assembly 20 is provided according to a second preferred embodiment of the present invention. The hinge assembly 20 includes a shaft 22, a spring 24, a follower 26 and a driving member 28. The shaft 22 includes a screw portion 222 at one end thereof, and a flange portion 224 at the other end thereof. The flange portion 224 includes two opposite projections 226 formed thereon. The flange portion 224 of the shaft 22 is engaged in the main body 202 of the mobile phone 200 via the projections 226, and cannot rotate relative to the main body 202.

The follower 26 is circular and disk-shaped. The follower 26 has a central hole 262 defined therethrough such that the follower 26 can be located around the shaft 22. The follower 26 has two hemispherical protrusions 264 disposed symmetrically on one surface thereof. In addition, the follower 26 has at least one rotating-stop mechanism such as a slot 266 defined in outer periphery thereof and extending axially along the follower 26. The slot 266 engages with a main body 202 of the mobile phone 200.

The driving member 28 is a substantially cylindrical body. The driving member 28 has two opposite protrusions 280 formed on outer peripheral wall thereof, the protrusion 280 being oriented parallel to a central axis of the driving member 28. The protrusions 280 are configured for engaging with the flip cover 204 of the mobile phone 200. The driving member 28 has a screw hole 282 defined therein and extending therethrough. The screw hole 282 corresponds to the shape of the screw portion 222 of the shaft 22, thereby facilitating engagement with the shaft 22. The driving member 28 has two hemispherical hollows 284 symmetrically defined in one end surface thereof. The hemispherical hollows 284 engage with the hemispherical protrusions 264 of the follower 26, and thus forming a friction-reducing member. The hemispherical hollows 284 can alternatively be partially hemispherical, arc-shaped relative to a central axis of the driving member 28, substantially semicircular relative to the central axis of the driving member 28, or have another suitable shape. Furthermore, the hemispherical hollows 284 can alternatively be a single substantially semicircular groove, a single substantially circular groove, or a single groove having another suitable shape.

In the assembly of the hinge assembly 20, referring to FIG. 4, firstly, the shaft 22 is passed through the spring 24, the central hole 262 of the follower 26, and the screw hole 282 of the driving member 28, in that order, with the screw hole 282 of the driving member 28 engaging with the screw portion 222 of the shaft 22.

Referring to FIGS. 4 and 6, in use, the driving member 28 is engaged (i.e., operatively located/fixed) in a cavity (not shown) of the flip cover 204 of the mobile phone 200, and cannot rotate relative to the flip cover 204. The flange portion 224 of the shaft 22 is engaged in the main body 202 of the mobile phone 200 via the projections 226, and cannot rotate relative to the main body 202. The main body 202 also has an engagement member such as a protruding block (not shown). The protruding block engages with the slot 266 of the follower 26 when the flip cover 204 is open position relative to the main body 202. The spring 24 is resisted between the flange portion 224 of the shaft 20 and the follower 26. The flip cover 204 can rotate relative to the main body 202 between an open position and a closed position via the hinge assembly 20.

When the flip cover 204 is in an open position, the flip cover 204 is locked on the main body 202 by a latch of the main body 202, and the spring 24 accumulates a predetermined spring force. The spherical protrusions 264 of the follower 26 tightly engage in the respective hemispherical hollows 284 of the driving member 28. In this state, the protruding block of the main body 202 does not lock in the slot 266 of the follower 26. When the flip cover 204 rotates relative to the main body 202 from the closed position to the open position, the latch is unlocked, and the follower 26 and the driving member 28 move axially along the shaft 22 and under the spring force of the spring 24. Simultaneously, the driving member 28 rotates relative to the shaft 22 under the screw engagement of the screw portion 222 of the shaft 22 with the screw hole 282 of the driving member 28, and thus makes the flip cover 204 rotate relative to the main body 202. Therefore, the flip cover 204 is opened relative to the main body 202. The follower 26 also rotates together with the driving member 28 under the biasing action of the spring 24 and the engagement of the spherical protrusions 264 with the hemispherical hollows 284 of the driving member 28. During the opening of the flip cover 204, the follower 26 cannot rotate relative to the driving member 28.

When the flip cover 204 rotates relative to the main body 202 from the open position to the closed position, When the flip cover 204 rotates relative to the main body 202 from the open position to the closed position, a button disposed outside the main body 202 is pressed so as to cause the protruding block to engage in the slot 266 of the follower 26. Thus, the follower 26 can only move axially along the shaft 22 and cannot rotate relative to the shaft 22 and the main body 202. In this state, the spring 24 is in a natural (i.e. relaxed) state. When the flip cover 204 is rotated from the open position to the closed position, a user exerts force on the flip cover 204, making the flip cover 204 rotate relative to the main body 202. The driving member 28 rotates together with the flip cover 204 and relative to the shaft 22. The driving member 28 moves axially along the shaft 22 and compresses the spring 24 under the screw engagement of the screw portion 222 of the shaft 22 and the screw hole 282 of the driving member 28. Simultaneously, the spherical protrusions 264 of the follower 26 slide out of the hemispherical hollows 284 of the driving member 28, and slide onto one end surface of the driving member 28. When the spherical protrusions 264 slide onto an edge of the hemispherical hollows 284 of the driving member 28, because the restoration length of the spring 14 is larger than the screw pitch of the screw portion 122 of the shaft 22, the spherical protrusions 264 of the follower 26 slidably engage in the hemispherical hollows 284 of the driving member 28 along a arcuate surface of the driving member 28. Thus, the flip cover 204 is completely folded upon the main body 202. Simultaneously, the flip cover 204 is locked on the main body 202 by the latch.

The hinge assembly 20 has small number of elements. The impact force which the flip cover 204 exerts on the main body 202 is reduced because of the screw engagement between the screw portion 222 of the shaft 22 and the screw hole 282 of the driving member 28. The hinge assembly 20 can achieve semi-automatic opening of the flip cover 204 relative to the main body 202 because of the engagement of the spherical protrusions 264 of the follower 26 and the hemispherical hollows 284 of the driving member 28.

Figure 8:
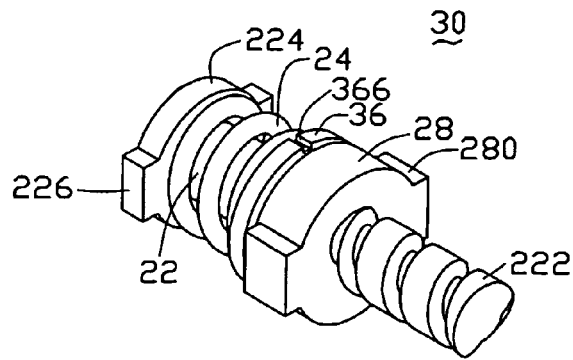
FIG. 8 is an assembled view of the hinge assembly according to a second embodiment of the present invention.
Figure 9:
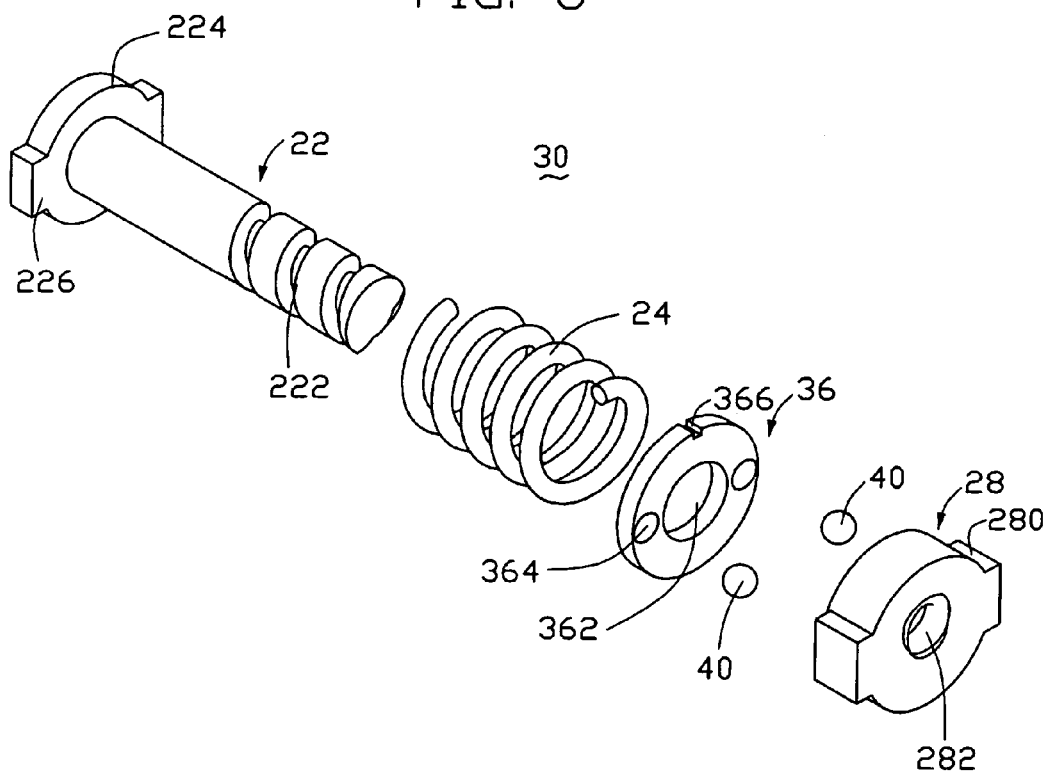
FIG. 9 is an exploded, isometric view of the hinge assembly of FIG. 8.
Figure 10:
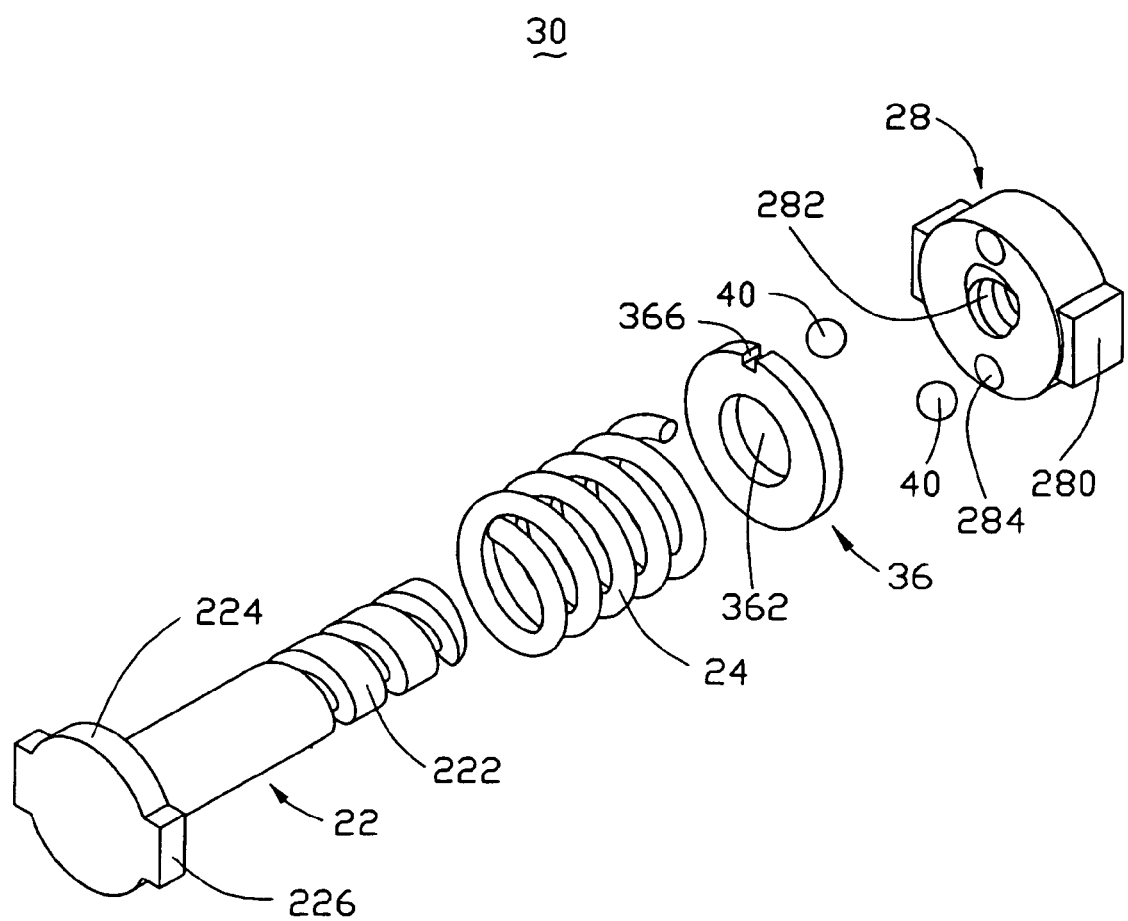
FIG. 10 is similar to FIG. 9, but viewed from another aspect.

Referring to FIGS. 8-10, a hinge assembly 30 is provided according to a third preferred embodiment of the present invention. The hinge assembly 30 includes a shaft 22, the spring 24, a follower 36, two ball bearings 40, and the driving member 28.

The follower 36 is circular and disk-shaped. The follower 36 has a central hole 362 defined therethrough such that the follower 36 can be located around the shaft 20. The follower 36 has two hemispherical hollows 364 symmetrically defined one end surface thereof facing the driving member 28. In addition, the follower 36 has at least one rotating-stop mechanism such as a groove 366 defined in outer periphery thereof and extending axially along the follower 36. The groove 366 engages with a main body 202 of the mobile phone 200.

The assembly process and operation of the hinge assembly 30 is same as that of the hinge assembly 20 except that two ball bearings 40 replace the spherical protrusions 264 of the follower 20. The ball bearings 40 are disposed between the follower 36 and the driving member 28, and tightly engage in the hemispherical hollows 364 of the follower 36 and the hemispherical hollows 284 of the driving member 28. Thus, a sliding friction produced by the relative rotation between the follower 26 and the driving member 28 is greatly reduced by being changed into a rolling friction produced between the follower 36 and the driving member 28, increased the lifetime of the hinge assembly 30.

In further alternative embodiments, the spring 14 can be made of a nonmetallic material such as plastic. Furthermore, the spring 14 can instead be made of another kind of elastic element or urging means known in the art, such as a resilient cylinder. Additionally, there can be more than one protrusion 126. It is also to be understood that the hinge assembly 10, 20 30 may prove useful in other environments besides that of foldable electronic devices.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly, comprising:
   a shaft having a threaded portion defined thereon;
   a follower rotatable about the shaft;
   a friction-reducing member;
   a driving member in the shape of a cylinder, the driving member having a threaded hole defined therethrough, the threaded hole engagingly receiving the threaded portion of the shaft; and
   an elastic member providing an urging force which makes the driving member integral with the follower rotate and simultaneously longitudinally movable along the shaft, and the friction-reducing member engage between the follower and the driving member.

2. The hinge assembly as claimed in claim 1, wherein the shaft comprises a securing portion formed thereon.

3. The hinge assembly as claimed in claim 2, wherein the hinge assembly is operated between a closed position and an opened position, wherein:
   from the closed position to the opened position, the follower integral with the driving member automatically rotates around and simultaneously moves along the shaft by the urging force of the elastic member, and
   from the opened position, the follower no longer rotates around the shaft, the driving member can be manually rotated relative to the follower and the shaft to compress the elastic member.

4. The hinge assembly as claimed in claim 3, wherein the elastic member has a first end and a second end, the first end of the elastic member abuts a flange, the second end of the elastic member biases the follower.

5. The hinge assembly as claimed in claim 4, wherein the follower is circular and disk-shaped, and has at least one rotating-stopping mechanism formed at an outer periphery thereof.

6. The hinge assembly as claimed in claim 5, wherein the at least one rotating-stopping mechanism is a groove.

7. The hinge assembly as claimed in claim 1, wherein the friction-reducing member consists of two hemispherical protrusions symmetrically disposed at one end surface of the follower, the driving member has two hemispherical hollows defined in one end surface thereof, the hemispherical protrusions engage with the hemispherical hollows.

8. The hinge assembly as claimed in claim 1, wherein the friction-reducing member comprises two ball bearings, the follower has two first hemispherical hollows defined in one end surface thereof, the driving member has two second hemispherical hollows defined in one end surface thereof opposite to the first spherical grooves, the two ball bearings engage with the first and the second hemispherical hollows.

9. The hinge assembly as claimed in claim 1, wherein the elastic member is a spring.

10. A hinge assembly, comprising:
    a shaft having a threaded portion defined at one end thereof, and a securing portion at an opposite end thereof;
    a follower rotatable about and simultaneously longitudinally movable along the shaft and having a first cam surface formed on one end surface thereof;
    a cam rotatable about the shaft and having a second cam surface formed on one end surface facing the first cam surface and a fixation portion formed on outer periphery, the cam having a threaded hole defined therethrough, the threaded hole engaging with the threaded portion of the shaft; and
    an elastic member providing an urging force which makes the follower move along the shaft and keep the first cam surface rotatably engaged with the second cam surface of the cam.

11. The hinge assembly as claimed in claim 10, wherein the hinge assembly configured for being operated between a closed position and an opened position, wherein:
    from the closed position to the opened position, the follower integral with the cam automatically rotates around and simultaneously moves along the shaft by the urging force of the elastic member, and
    from the opened position, the follower no longer rotate around the shaft, the cam is manually rotated relative to the follower and the shaft to compress the elastic member.

12. The hinge assembly as claimed in claim 11, wherein the elastic member has a first end and an opposing second end, the first end of the elastic member abuts the securing portion, the opposite second end of the elastic member biases the follower.

13. The hinge assembly as claimed in claim 12, wherein the elastic member is a spring.

14. The hinge assembly as claimed in claim 13, wherein the follower is cylindrical, and has at least one rotating-stopping mechanism formed at an outer periphery thereof.

15. The hinge assembly as claimed in claim 14, wherein the at least one rotating-stopping mechanism is a slot.

16. The hinge assembly as claimed in claim 10, wherein the fixation portion comprises two opposite protrusions protruding from the outer periphery of the cam.

17. A foldable electronic device comprising:
    a main body;
    a flip cover; and
    a hinge shaft comprising a securing portion fixed relative to one of the main body and the flip cover;
    a rotating member fixed relative to the other of the main body and the flip cover, the rotating member having a threaded hole defined therethrough, the hinge shaft comprising a threaded portion, the threaded hole engaging with the threaded portion, the rotating member rotatably engaged with the shaft in such a manner that rotation of the rotating member causes a relative helical movement between the rotating member and the hinge shaft;
    a follower rotatable relative to the rotating member and rotatable about and simultaneously longitudinally movable along the hinge shaft;
    an elastic member biasing the follower into engagement with the rotating member, the rotating member comprises a first cam surface, the follower comprises a second cam surface, and the first and second cam surfaces engage with each other, the engagement of the rotating member with the follower being configured such that a relative rotation therebetween causes a relative axial movement therebetween.

* * * * *